Sept. 5, 1950      H. L. THEROLF      2,521,314
RUBBER INSERT TYPE RECIPROCATING VALVE
Filed June 10, 1949
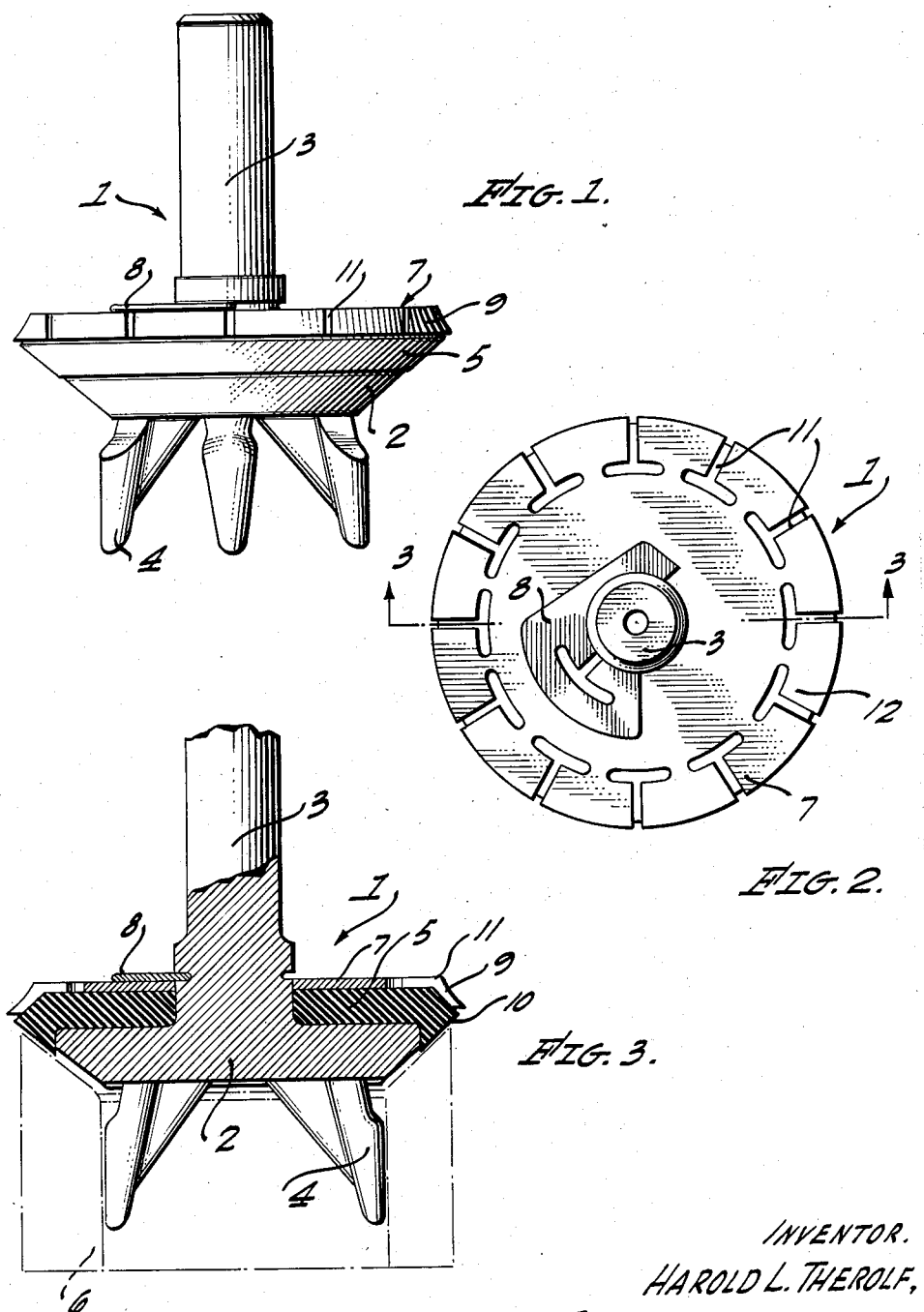
INVENTOR.
HAROLD L. THEROLF,
BY
ATTORNEY.

Patented Sept. 5, 1950

2,521,314

UNITED STATES PATENT OFFICE 2,521,314

RUBBER INSERT TYPE RECIPROCATING VALVE

Harold L. Therolf, Los Nietos, Calif.

Application June 10, 1949, Serial No. 98,252

3 Claims. (Cl. 251—160)

1

This invention relates to a rubber insert type of valve, and particularly the valves used on heavy equipment, such as line pumps, slush pumps, oil well pumps, and the like.

An object of my invention is to provide a novel means of containing the rubber seal in reciprocating type valves, and particularly confining this seal when materials are pumped which cause the rubber to swell.

Another object of my invention is to provide a novel means of containing the insert of a valve in which a constant yieldable pressure is exerted on the insert, thus urging this insert into its proper position at all times.

A feature of my invention is to provide a novel valve of the character stated, in which the top plate is slotted to form a plurality of yieldable fingers which engage the insert and urge the insert to its proper position at all times.

Another feature of my invention is to provide a novel valve construction of the character stated, which will increase the life of the rubber or plastic insert and which will so hold this insert that cutting of the valve and valve seat is prevented.

Other objects, advantages and features of invention may appear from the accompanying drawing, the subjoined detailed description and the appended claims.

In the drawing:

Figure 1 is a side elevation of my valve.

Figure 2 is a top plan view of the same.

Figure 3 is a sectional view taken on line 3—3 of Figure 2.

Referring more particularly to the drawing, my valve 1 includes a body 2, a central stem 3, rising therefrom, and a plurality of wing guides 4 depending from the body. The stem, body and wing guides are all integrally formed in the preferable embodiment of my invention.

An insert 5 rests on the body 2 and projects slightly beyond the periphery of the body, substantially as shown in Figures 1 and 3. The insert 5 rests upon and seals with the valve seat 6 in the usual and well known manner. The insert 5 is held in position by means of the plate 7, which rests on the insert and is pressed against the same by the spring key 8. This key fits in a suitable groove in the stem 3, all of which is usual and well known in the art. The plate 7 is formed with a flange 9, the inner face of which is tapered to fit the outer tapered edge 10 of the insert 5. These two tapered surfaces, namely, the outer edge of the insert 5 and the inner face of the plate 7 tend to urge and press the periphery of

2 the insert inwardly and downwardly, thus tending to hold this insert in its proper position.

To yieldably press the insert 5 downwardly, I provide a plurality of radial slots in the plate 7, these radial slots being indicated at 11. These radial slots divide the plate 7 into a plurality of fingers adjacent the outer edge of the plate, and these fingers yieldably press the insert 5 downwardly, also, the spring finger type of plate permits the insert 5 to swell if necessary and will still hold the insert in its proper position. The slots 11 can be either straight radial slots or they may be T slots, as shown in the drawing. The amount of metal which is cut away in the plate 7 will determine the yieldability of the various spaced fingers designated at 12.

Having described my invention, I claim:

1. A valve comprising a body and a stem rising from said body, a yieldable insert resting on top of said body and extending to the periphery thereof, a substantially cup shaped plate resting on said insert, a depending flange on the plate bearing against the periphery of the insert, means securing the plate to the body, said plate having a plurality of substantially T-shaped slots in the top thereof, and said slots extending downwardly through the depending edge, said slots being circumferentially spaced whereby said plate yieldably presses the insert against the body.

2. A valve comprising a body and a stem rising from said body, a yieldable insert resting on top of said body and extending to the periphery thereof, a substantially cup shaped plate resting on said insert, a depending flange on the plate bearing against the periphery of the insert, means securing the plate to the body, said plate having a plurality of substantially T-shaped slots in the top thereof, and said slots extending downwardly through the depending edge, said slots being circumferentially spaced whereby said plate yieldably presses the insert against the body, the inner surface of said depending flange being tapered, and a complementary taper on the insert, said tapers being fitted together.

3. A valve comprising a body and a stem rising from said body, an insert resting on top of the body and surrounding the stem, a substantially cup shaped plate resting on the top of said insert, said plate including a depending flange, the inner surface of said depending flange being tapered outwardly, the peripheral edge of said insert being tapered outwardly to fit the first named taper on the plate, said plate having a plurality of slots in the top and in the depending edge thereof, said slots being circumferentially spaced whereby said plate yieldably presses the insert against the body.

HAROLD L. THEROLF.

REFERENCES CITED

The following references are of record in the file of this patent:

UNITED STATES PATENTS

| Number | Name | Date |
|---|---|---|
| 1,045,619 | Schweizer | Nov. 26, 1912 |
| 1,485,508 | Kiley | Mar. 4, 1924 |
| 1,703,674 | Kiley | Feb. 26, 1929 |
| 1,774,690 | Willoughby | Sept. 2, 1930 |
| 1,963,685 | Shimer | June 19, 1934 |
| 1,964,249 | Chase | June 26, 1934 |
| 2,103,503 | White | Dec. 28, 1937 |
| 2,229,823 | Sharp | Jan. 28, 1941 |